(12) United States Patent
Schuba et al.

(10) Patent No.: US 8,626,620 B2
(45) Date of Patent: Jan. 7, 2014

(54) METHODS AND DEVICES FOR CHARGING-STATE DEPENDENT DETERMINATION OF SERVICE ACCESS TARIFF RATES BY BID PROCESS

(75) Inventors: Marko Schuba, Aldenhoven (DE); Raphaël Quinet, Liège (BE); Rainer Hansen, Prüm (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 420 days.

(21) Appl. No.: 12/523,294

(22) PCT Filed: Jan. 16, 2007

(86) PCT No.: PCT/EP2007/050416
§ 371 (c)(1),
(2), (4) Date: May 5, 2010

(87) PCT Pub. No.: WO2008/086888
PCT Pub. Date: Jul. 24, 2008

(65) Prior Publication Data
US 2010/0217696 A1    Aug. 26, 2010

(51) Int. Cl.
| | |
|---|---|
| *H04M 11/00* | (2006.01) |
| *G07B 17/00* | (2006.01) |
| *G07F 19/00* | (2006.01) |
| *H04M 15/00* | (2006.01) |
| *G06Q 40/00* | (2012.01) |
| *G06G 7/00* | (2006.01) |
| *G06F 17/00* | (2006.01) |
| *G06F 15/16* | (2006.01) |

(52) U.S. Cl.
USPC .......... 705/34; 705/30; 705/35; 705/37; 705/400; 709/223; 709/224; 709/225; 709/226; 455/403; 455/405; 455/406; 379/114.01; 379/114.02; 379/114.03; 379/114.04; 379/114.05; 379/114.06; 379/114.07; 379/114.08

(58) Field of Classification Search
None
See application file for complete search history.

(56) References Cited

U.S. PATENT DOCUMENTS

| | | | |
|---|---|---|---|
| 6,374,227 B1 * | 4/2002 | Ye | 705/7.25 |
| 7,606,354 B2 * | 10/2009 | Meincke | 379/114.03 |
| 2002/0010676 A1 | 1/2002 | Honma | |
| 2004/0010592 A1 * | 1/2004 | Carver et al. | 709/226 |
| 2004/0111308 A1 * | 6/2004 | Yakov | 705/8 |

(Continued)

FOREIGN PATENT DOCUMENTS

WO    WO 01/89191 A    11/2001

*Primary Examiner* — Ryan Zeender
*Assistant Examiner* — Allen Chein

(57) ABSTRACT

Methods and devices for charging a user for access to a service accessible via a communication network are disclosed. At least two charging-related states are defined for the communication network. A tariff proposal entity associated with the user determines one or more tariff proposals for charging the user for accessing the service and sends the one or more tariff proposals to a rating entity. The rating entity analyzes the one or more tariff proposals in relation to a current charging-related state of the at least two charging-related states, wherein it is determined if at least one of the one or more tariff proposals complies with at least one tariff setting associated with the current charging-related state. The rating entity further selects a tariff of the at least one complying tariff proposals for charging the user for access to the service and initiates a charging of the user for access to the service according to the selected tariff.

12 Claims, 6 Drawing Sheets

(56) References Cited

U.S. PATENT DOCUMENTS

| | | | |
|---|---|---|---|
| 2007/0249359 A1* | 10/2007 | Barbaresi | 455/450 |
| 2008/0172679 A1* | 7/2008 | Shen et al. | 719/318 |
| 2008/0232574 A1* | 9/2008 | Baluja et al. | 379/221.02 |
| 2009/0132400 A1* | 5/2009 | Conway | 705/34 |

* cited by examiner

METHODS AND DEVICES FOR CHARGING-STATE DEPENDENT DETERMINATION OF SERVICE ACCESS TARIFF RATES BY BID PROCESS

FIELD OF THE INVENTION

The present invention relates to communication, in particular to charging a user for access to a service accessible via a communication network.

BACKGROUND OF THE INVENTION

Services can be accessed by users via a communication network operated by a network operator. A service that is accessible via a network operator's communication network may be provided by a service provider different from the network operator. Alternatively, the service provider and the operator can be identical. A user may operate a user device like a mobile phone or a computer for service access via the communication network.

Examples for services are typical telecommunication services like e.g. making a phone call, sending messages via Short Message Service (SMS) or Multimedia Messaging Service (MMS) or downloading a ring tone or a video clip or mobile television.

A common feature is that commercial operators charge a user for service access, i.e. for the activation and/or the usage of a service.

Rating is the practice of determining the cost for access to a particular service. The rating process involves converting data that is related to the access of a service into monetary-equivalent value. The rating process further considers tariffs for calculating the price to be charged to the user for service access. Data that is related to the access of a service, in the following denoted "service access related data", is typically quantifiable and certain types exist like time property (e.g. day of week, date, time of day) or amount of usage (e.g. duration of call, amount of data, number of messages, number of songs), destination of the call (e.g. land line, overseas), or origin of call or location of the caller, or type of network used (e.g. mobile network, fixed network). Another example for service access related data is the type of subscription of a user, e.g. regular or premium service subscription, minute-based or second-based, flat-rate or not.

A tariff typically consists of a rate and/or a fee. A rate is the price set for an event, e.g. price per unit per minute or price per unit of transferred data. A fee is a—typically fixed—amount that can be added on when charging for certain events, e.g. a fee may be raised when a roaming call is connected. An event may be identical to service access related data or derived therefrom.

A rating entity, sometimes also known as rating engine, can be employed to determine the cost to be charged for access to a service. The rating entity may collect service access related data and calculate the costs for the service access under consideration of an applicable tariff. The determination of the applicable tariff may depend on at least some of the service access related data. A typical example for a service access by a user is a mobile phone call made by the user to another user, wherein the location and subscription information of both users, the time of service activation (e.g. working hours or weekend etc.) typically have an impact on the applicable tariff which can be determined by the operator taking into account the aforementioned service access related data. The rating engine may then calculate the costs for the call, e.g. based the duration of the call under consideration of the tariff comprising a rate on a per minute base and a fee for roaming users.

Common to all known charging systems is that tariffs are set by the communication network operators. If a service is provided by a service provider different from the network operator, the service provider may impact the tariff in addition.

Cost-aware users can only minimize their bill by influencing service access related data as far as possible, e.g. by reducing the number and duration of service access or avoiding roaming. However, this behavior is inconvenient for the user and also detrimental for the operators that have an interest in increased service access especially in case of low communication network load. On the other hand, operators need some means to control service access in situations of high communication network load, e.g. by prioritizing premium users over regular users. However, such a control mechanism based on fixed subscription is highly inflexible and does not fit to users that urgently need to access a service and would be willing to pay more.

SUMMARY OF THE INVENTION

It is therefore an object of the invention to provide methods, devices, and computer programs that provide for more convenience and flexibility for a cost-optimized charging adapted especially for situations of high and/or low communication network load.

The invention discloses a method for charging a user for access to a service. The service is accessible via a communication network wherein at least two charging-related states are defined, e.g. a first charging-related state associated with low communication network load conditions and a second charging-related state associated with high communication network load conditions.

A tariff proposal entity may be triggered by reception of a request to determine one or more tariff proposals for charging the user for accessing the service. The tariff proposal entity determines the one or more tariff proposals in accordance with preferences of the user and sends to a rating entity the determined one or more tariff proposals for charging the user for accessing the service.

At the rating entity, the one or more tariff proposals for charging the user for accessing the service are received from the tariff proposal entity which is associated with the user. The rating entity analyzes the one or more received tariff proposals in relation to a current charging-related state of the at least two charging-related states. In the analysis it is determined if at least one of the one or more tariff proposals complies with at least one tariff setting associated with the current charging-related state. A tariff setting associated with a charging-related state may be any kind of information based on that the compliance of the one or more tariff proposals can be determined. A tariff setting can be for example a tariff defined e.g. by a communication network operator and optionally a service provider providing service. A tariff setting may be stored at the rating entity or obtained for the analysis from a source external to the rating entity.

The rating entity selects a tariff of the at least one complying tariff proposals. Preferably the selected tariff is identical to one of the tariff proposals. However, a selected tariff and a tariff proposal may differ slightly in order to accomplish and ascertain the compliance between the at least one tariff proposal and the at least one tariff setting. Furthermore, the rating entity initiates a charging of the user for access to the service according to the selected tariff.

According to the present invention, users are provided with the opportunity to influence the tariffs used in the charging process. Tariff proposals can be provided ad-hoc, e.g. when a service access request is made or during service access, and can be adapted to a current of various charging-related states being associated e.g. with different communication network load conditions. In addition, tariff proposals are analyzed for compliance with tariffs settings set by the operator and optionally, as explained previously, by the service provider for the current charging-related state and are selected accordingly. Hence, charging can be performed in a very flexible and convenient way and suits both the preferences of the users and the interests of the operators.

In the following, detailed embodiments of the present invention shall be described in order to give the skilled person a full and complete understanding. However, these embodiments are illustrative and not intended to be limiting.

BRIEF DESCRIPTION OF THE FIGURES

FIG. 3a shows a method flow-chart diagram according to an embodiment of the present invention;

FIG. 3b shows a message and process chart relating to the embodiment according to FIG. 3a;

FIG. 4a shows a method flow-chart diagram according to an embodiment of the present invention;

FIG. 4b shows a message and process chart relating to the embodiment according to FIG. 4a;

DETAILED DESCRIPTION OF THE INVENTION

Figure 1:
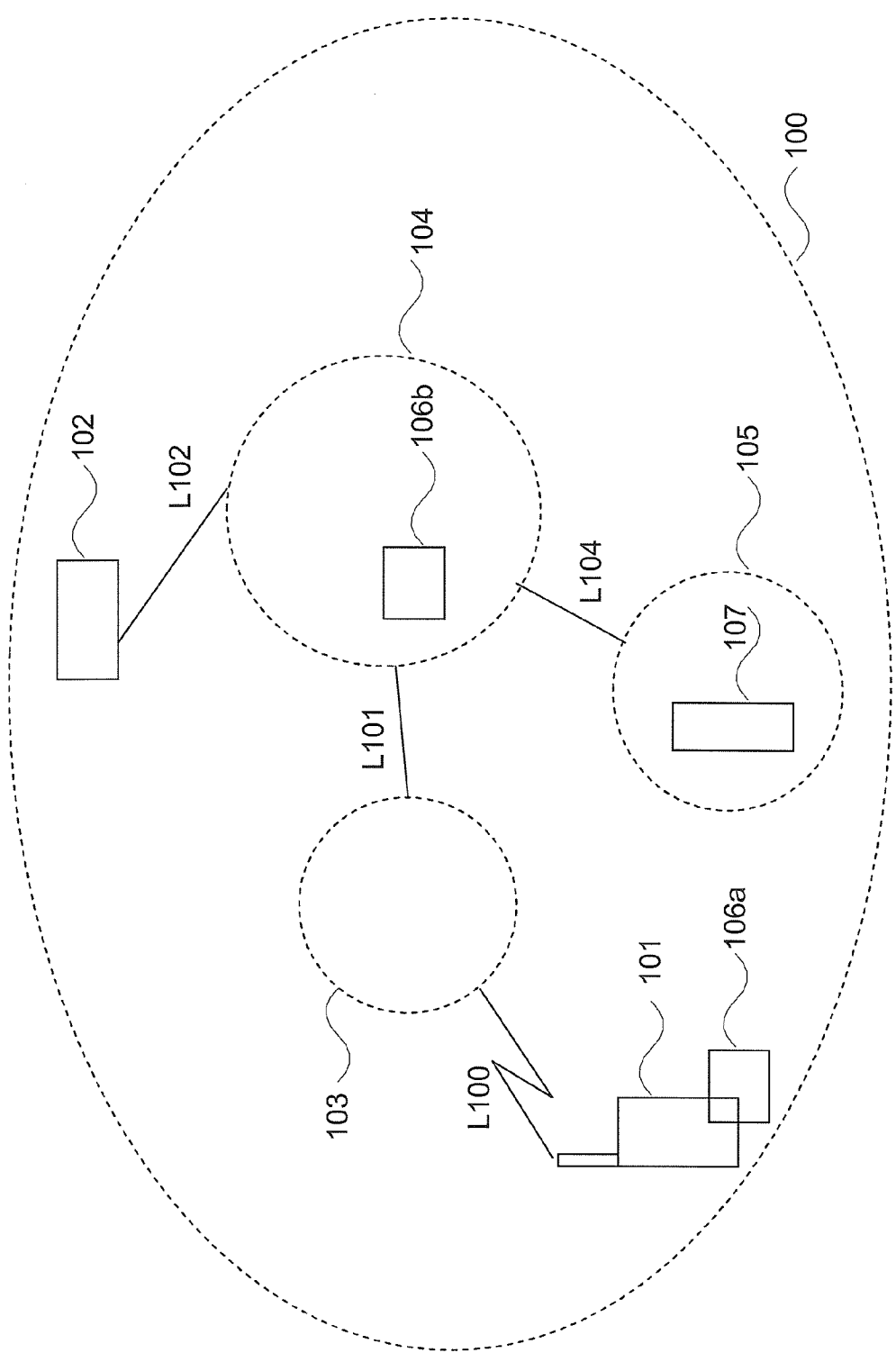
FIG. 1 shows a schematic illustration of a communication network embodiment according to the present invention.

FIG. 1 depicts an illustration of a communication network 100 operated by an operator. The communication network 100 comprises an access network 103, a core network 104, and a charging system 105 that are connected via respective links L101 and L104. It may also be possible to incorporate the charging system into the core network (not depicted).

Examples for a communication network are a Global System for Mobile communications (GSM) network, a General Packet Radio System (GPRS) network, a Universal Mobile Telecommunication System (UMTS) network, or fourth generation (4G) network, a wired telephone or data network or combinations of such communication networks. In those aforementioned mobile communication network examples, the charging system would be preferably a part of the core network.

The communication network 100 may comprise further entities like e.g. a service network or an operational support system or further connections which are not shown for simplicity reasons. The communication network 100 further offers a service 102 that is accessible for a user operating a user device 101, here exemplary shown as mobile phone. The offered service 102 is depicted for illustrative reasons within the communication network 100 because the access to the service is accomplished via the communication network 100. A device like a server at which the accessible service 102 is located, can be located within the communication network 100 (e.g. within the core network 104) or external to the communication network 100.

The service 102 can be accessed via the communication network 100, e.g. from the user device 101 via the access network 103 and the core network 104 and the respective links L100,L101,L102.

The communication network 100 further comprises a rating entity 107 and at least one tariff proposal entity 106a, 106b. A tariff proposal entity can be located at a user device 101 as illustrated for tariff proposal entity 106a. For this type of arrangement, the term "terminal-centric" may be used further on. A terminal-centric tariff proposal entity may be comprised in a user device 101 or connectable thereto.

Alternatively or in addition, a tariff proposal entity may be located at other parts of the communication network remote from the user device 101, e.g. like tariff proposal entity 106b located in the core network 104. For such an arrangement where the tariff proposal entity is located remote from the user device 101 in the communication network, the term "network-centric" is also used in the following. Primarily, this term refers to arrangements wherein the user device 101 and the tariff proposal entity 106b are separated via a wireless link of a wireless access network.

A user may be associated with at least one of a network-centric and terminal-centric tariff proposal entity. For example, at a first charging-related state associated with e.g. high communication network load conditions, a network-centric tariff proposal entity e.g. like tariff proposal entity 106b may be used whereas at a second charging-related state associated with e.g. at low communication network load conditions, a terminal-centric tariff proposal entity like e.g. tariff proposal entity 106a may be used. A switch from a network-centric tariff proposal entity to a terminal-centric tariff proposal entity (and/or vice versa) may be initiated when the current charging-related state changes from a first charging-related state to a second charging-related state (and/or vice versa).

Figure 2:
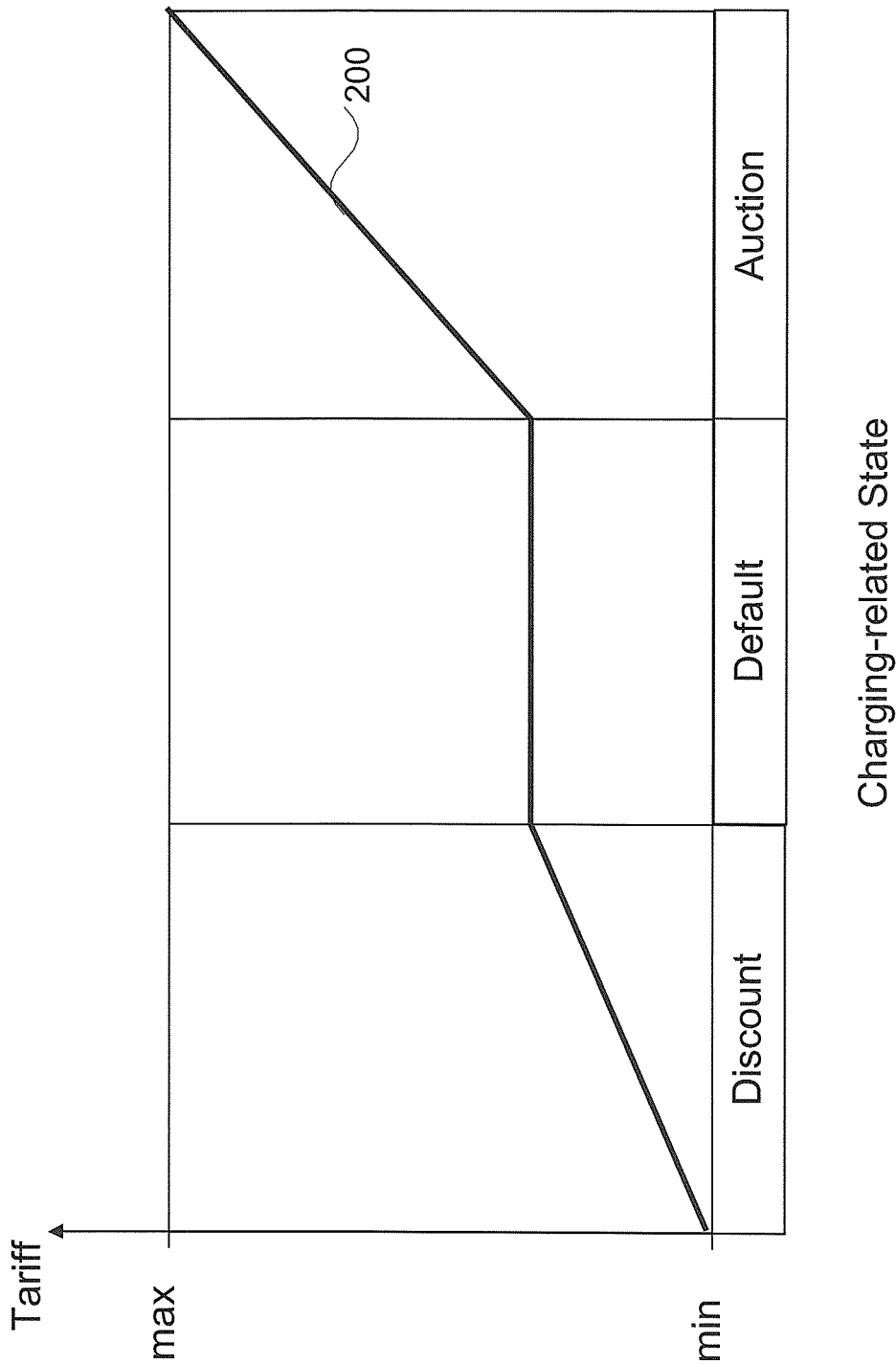
FIG. 2 shows an illustration of charging-related states and tariff settings according to an embodiment of the present invention.

FIG. 2 shows an example for charging-related states denoted as "Discount", "Default", and "Auction" being defined in a communication network. The charging-related states are associated with tariff settings, here indicated by line 200. For charging-related state "Discount" the associated tariff settings 200 are low and may apply for high service availability, e.g. in case of low communication network load. Correspondingly, charging-related states "Default" and "Auction" have increasingly higher tariff settings as indicated by line 200, e.g. in order to reflect for higher costs to be charged for medium and high communication network load conditions.

The line 200 associated with tariff settings indicates that tariff proposals of higher value have to be submitted for charging-related state "Auction" compared to further charging-related states "Default" and "Discount" in order to comply with the tariff setting associated with charging-related state "Auction". Minimum and/or maximum threshold parameter may limit tariff settings as indicated by "min" and "max" for limiting a tariff to be selected.

The communication network may be configured that for each of the defined charging-related states tariffs for charging the users for service access are selected from submitted tariff proposals that comply with at least one tariff setting associated with a current charging state. Alternatively, this may be possible only for a sub-set of the at least two defined charging-related states. For example, a selection of a complying tariff proposal may be only allowed for charging-related states "Discount" and "Auction" while for charging-related state "Default" a tariff proposal received at the rating entity may be discarded right away, because the default tariff settings of the operator shall apply. Accordingly, the operator can define for the at least two charging states if a received tariff proposal is considered for an analysis and selection or not, thus providing an efficient initial filtering for those charging-related state(s) where a tariff proposal consideration is wanted by the operator or not.

For charging a user for access to a service accessible via a communication network wherein at least two charging-related states are defined, a tariff proposal entity may be triggered by reception of a request to determine one or more tariff proposals for charging the user for accessing the service. The tariff proposal entity determines the one or more tariff proposals in accordance with preferences of the user and sends to a rating entity the determined one or more tariff proposals for charging the user for accessing the service. The determination of the one or more tariff proposals may be influenced by various parameters known by the tariff proposal entity, including but not limited to a previously failed attempt to obtain service access. Sending of the determined at least one tariff proposal to the rating entity may be accomplished in a push- or pull-like manner. The tariff proposal entity may send the determined one or more tariff proposals to the rating entity or to another entity from which the determined one or more tariff proposals are further sent to the rating entity or from which they can be downloaded by the rating entity. The one or more tariff proposal entities may be sent via a single message or a sequence of messages, e.g. in form of a dialog with the rating entity.

At the rating entity, the one or more tariff proposals for charging the user for accessing the service are received from the tariff proposal entity which is associated with the user. The rating entity analyzes the one or more received tariff proposals in relation to a current charging-related state of the at least two charging-related states. In the analysis it is determined if at least one of the one or more tariff proposals complies with at least one tariff setting associated with the current charging-related state.

The rating entity selects a tariff of the at least one complying tariff proposals and initiates a charging of the user for access to the service according to the selected tariff.

A selected tariff and a tariff proposal may differ slightly in order to accomplish and ascertain the compliance between the at least one tariff proposal and the at least one tariff setting, e.g. for adapting the tariff proposal such that it can be processed by the rating entity which may be configured to process tariffs up to maximum two decimal places while the tariff proposal may have more than two decimal places such that rounding of the tariff proposal has to be carried out so that it can be determined that the tariff proposal and the tariff setting comply.

Preferably, in the analyzing step the one or more tariff proposals are analyzed according to an order specified by the tariff proposal entity. The order may reflect user preferences and is especially useful if the tariff proposal entity submits multiple tariff proposals for a service access such that the tariff proposals are analyzed according to the user preferences. For example, the associated tariff proposal entity may submit tariff proposals of increasing value. If the user preference is lowest price, the rating entity may be thus ordered to start the analysis for the tariff proposal of lowest value at the risk that the tariff proposal of lowest value and further lower value tariff proposals do not comply with the tariff settings of the current charging-related state and that it takes a while until a complying tariff proposal can be determined. According to another example, the order may be to start the analysis at a higher value tariff proposal if quicker access is required.

The rating entity may determine the tariff settings associated with the current charging-related state based on service access related data. This service access related data may be received at the rating entity in conjunction with the one or more tariff proposals and may be used by the rating entity to refine the tariff settings to be used in the compliance analysis to particularities of the service, service access, and the user.

A communication network load condition may determinable for any part of a communication network, e.g. on cell-, node-, sub-network-, network-, area- (e.g. location area or service area), and/or on link-level. A communication network load condition may be allocated to a leveling scheme, e.g. for indicating if a communication network load condition is on a high, a medium, or a low level. Correspondingly, charging-related states corresponding to the communication network load levels may be determined, e.g. charging-related state "Discount" for communication network load level "LOW" and charging-related state "Auction" for communication network load level "HIGH".

The at least two charging-related states may be associated with at least two communication network load conditions. Furthermore, the rating entity may be adapted to select an address for communication with the tariff proposal entity in dependence of the current charging-related state being e.g. determined according to a current communication network load condition. The rating entity may be adapted to switch from a first tariff proposal entity being associated with a first charging-related state to a second tariff proposal entity being associated with the second charging-related state by switching from an address associated with the first tariff proposal entity associated with the user to an address of the second tariff proposal entity associated with the user. For example, for a high communication network load condition with current charging-related state "Auction", the rating entity may turn to a network-centric tariff proposal entity 106*b*. For low communication network load conditions being associated with current charging-related state "Discount" with free capacity on a wireless link L100, the rating entity may communicate with a terminal-centric tariff proposal entity 106*a*.

Users may feel more confident if they can verify the selected tariff. An approval of the selected tariff by the user may be even mandatory to fulfill legal charging requirements for certain jurisdictions wherein the communication network is operated, even for the case if the selected tariff proposal is lower than the default one. Preferably, an indication of the selected tariff is sent to the user device operated by the user for requesting approval of the selected tariff and the charging according to the selected tariff is initiated when a response to the approval request from the user is in the affirmative.

Alternatively, when the approval access is not in the affirmative, service access may be denied and a (small) fee set by the operator may be charged to the user who rejected the proposal. Alternatively, the communication network may be configured to provide requested service access and charge according to a default tariff defined by the operator.

Preferably, the rating entity performs the step of initiating access to the service after the selection of the tariff and/or after the reception of the affirmative response to the approval request. Hence, access to the service can be granted under the condition that the applicable tariff (i.e. the selected tariff) for the service access is in consent with the user.

The rating entity may receive from at least one further entity associated with at least one further user one or more further tariff proposals for charging the at least one further user for accessing the service. The rating entity may analyze the received one or more tariff proposals of the user and the at least one further user in relation to the current charging-related state. In the analysis it is determined if said received one or more tariff proposals of the user and the at least one further user comply with the at least one tariff setting. Furthermore, one or more most valuable tariffs of the one or more complying tariff proposals are selected. The selection may be performed on a per user base up to a maximum number of users allowed for access to the service. The rating entity initiates a charging for access to the service for at least one user of the user and the at least one further user for which a most valuable tariff has been selected, the charging being in accordance with the selected most valuable tariff corresponding to said at least one user of the user and the at least one further user.

In other words, in the analysis it is checked if the tariff proposals comply with the at least one tariff setting. It can happen that a user submits more than one tariff proposal from which more than one is compliant. In this case, only the most valuable tariff proposal for this particular user is considered further on. However, this does not mean that for each user the corresponding complying most valuable tariff proposal is necessarily processed further, because service access is limited to a maximum number of users. Thus, in case the number of users with complying most valuable tariff proposal exceeds the maximum number of allowed users, the number of users is reduced to the maximum number. For example, the number of user submitting tariff proposals is X, the number of complying most valuable tariff proposals Y, and the number of allowed users is Z with X>Y>Z, then the number of users that will be charged is Z. Selection criteria is preferably the value of the complying most valuable tariff proposals, i.e. only the Z complying most valuable tariff proposals of highest value of the overall Y complying most valuable tariff proposals are selected for the charging process and only those Z associated users may get access to the service. More selection criteria may be applied, e.g. in case too many equal complying most valuable tariff proposals exist. In the end, a number of X-Z users are not considered for service access, among those number Y-Z of users with complying most valuable tariff proposals of too low value or otherwise filtered out.

It may happen that the rating entity receives during service access one or more subsequent tariff proposals, e.g. from the user and/or the at least one or more further users. In this case, the rating entity may analyze the one or more subsequent tariff proposals for compliance with at least one tariff setting associated to a current charging-related state of the at least two charging-related states. The current charging-related state considered in the subsequent analysis (i.e. during service access) does not necessarily have to be the same current charging-related state as in the previous analysis (e.g. before service access). Hence, tariff settings considered in the previous and the subsequent analysis may differ. Consequently, compliance may be achieved differently and a complying subsequent tariff proposal may be different from a previous one (of course they can be also the same, especially if the charging-related state and the associated tariff settings have not changed). The rating entity can select a subsequent tariff of the one or more subsequent tariff proposals and initiates an adaptation of the charging for access to the service according to the selected subsequent tariff.

The tariff proposal entity may be configured to send out one or more tariff proposals on its own initiative, e.g. in a periodical fashion. Alternatively, the tariff proposal entity may be requested by the user and/or the rating entity for a subsequent tariff proposal submission.

The tariff proposal entity may be informed about a change in communication network load condition and may be triggered to send to the rating entity one or more new tariff proposals. Alternatively or in addition, the such informed tariff proposal entity may turn to the user device for informing the user about the changed communication network load condition and for requesting the user to determine and/or approve one or more tariff proposals adapted to the changed communication network load condition. Alternatively or in addition to the changed communication network load condition, a changed charging-related state and/or one or more associated tariff settings may be communicated to the aforementioned one or more entities and processed in a similar manner for sending one or more new tariff proposals to the rating entity with or without involvement of the user device.

Alternatively or in addition, the rating engine may store previously received one or more tariff proposals and re-analyze them if a charging-related state and thus its at least one associated tariff setting changes.

The rating entity can thus select a currently applicable tariff output by the analysis which may be replaced by a subsequently applicable tariff output by a subsequent analysis.

The adaptation is especially useful for changing communication network load conditions effecting a change of the current charging-related state and thus changing the associated at least one tariff settings. Consequently, a previously compliant tariff proposal may no longer be compliant and a previously non-compliant tariff proposal may become compliant later on.

A change of the charging-related state may not have an effect on the charging for a service that is already accessed and charged according to a previously selected tariff. However, there might be communication networks and/or services that are operated and may demand for an adaptation of the tariff to the current charging-related state, because e.g. a previously selected tariff may be no longer compliant with the one or more tariff settings of a changed current charging related state. Hence, adaptation of the selected tariff (e.g. by submission and analysis of subsequent one or more tariff proposals and/or analysis of stored previously submitted tariff proposals) may increase the probability that a user does not get disconnected from service access.

Furthermore, the submission and analysis of the one or more subsequent tariff proposals and/or the re-analysis of previously received and stored tariff proposals can lead to a tariff improvement for the user, because when the tariff setting associated with a changed charging-related state drops e.g. to a certain extent, the previously selected applicable tariff may be too high and it is beneficial for the user to have it replaced by a lower tariff in consent with the user and still compliant with the network operator's and optionally service provider's tariff settings.

Preferably, the tariff proposal entity receives information about a current charging-related state of the at least two charging-related states and considers the current charging-related state when determining the one or more tariff proposals. The current charging-related state can be indicated to the tariff proposal entity from any communication network entity, e.g. a core network entity or an access network entity. Furthermore, for indicating a current charging-related state to a user, the current charging-related state may be output on a user device, e.g. on a display or via a loudspeaker or via other user output means. Different tariff settings may be associated with different charging-related states as described e.g. in conjunction with FIG. 2 and the knowledge of the current charging-related state—and preferably in addition the applicable current tariff settings—increase the probability that the at least one tariff proposal received at the rating entity complies with the tariff settings of the current charging-related state.

The communication network may comprise a wireless access network and the user device may be operated at a first side of the wireless access network and the tariff proposal entity and the rating entity may be operated at a second side of the wireless access network, e.g. as illustrated in FIG. 1 for tariff proposal entity 106*b*. According to a network-centric solution, the tariff proposal entity associated with the user is located "within the network" and may be adapted to propose tariffs on behalf of the user. User preferences may be configured by the user in a previous configuration that may apply for multiple service accesses. User preferences may be set by the user for a particular service or for a particular service type.

Preferably, the tariff proposal entity is connectable to the rating entity via a link with such a capacity that it can communicate without (significant) delays with the rating entity. A network-centric arrangement has therefore especially advantages in wireless communication networks wherein almost always a wireless link capacity provides for the bottleneck, whereas connections between entities "within the network" are typically much less affected by overload. Alternatively or in addition, the tariff proposal entity may be operated at the user device, which may provide for more instantaneous interaction between the user and the tariff proposal entity, e.g. to increase user-experience if service access is to be auctioned. An example can be found in FIG. 1 with the tariff proposal entity 106*a*.

Preferably, the tariff proposal entity comprises a software agent. A software agent comprises software that acts on behalf of a user. Such "action on behalf of" implies the authority to decide when (and if) action is appropriate. Related and derived concepts include intelligent agents (in particular exhibiting some aspect of Artificial Intelligence, such as learning and reasoning), autonomous agents (capable of modifying the way in which they achieve their objectives), distributed agents (being executed on physically distinct machines), multi-agent systems (distributed agents that do not have the capabilities to achieve an objective alone and thus must communicate), mobile agents (agents that can relocate their execution onto different processors) and more.

The usage of a software agent has therefore the advantage that user interaction can be minimized, even to zero interaction depending on the user preferences, legal requirements, etc, and is especially advantageous for network-centric embodiments wherein the tariff proposal entity is preferably adapted to act autonomously with minimized user interaction.

A software agent may be capable to learn from previous submissions of tariff proposals in order to adapt tariff proposals that are to be determined in a current determination process to probable tariff settings of a (probable) current charging-related state to increase the probability that at least one of the one or more determined and sent tariff proposals comply.

Figure 3:
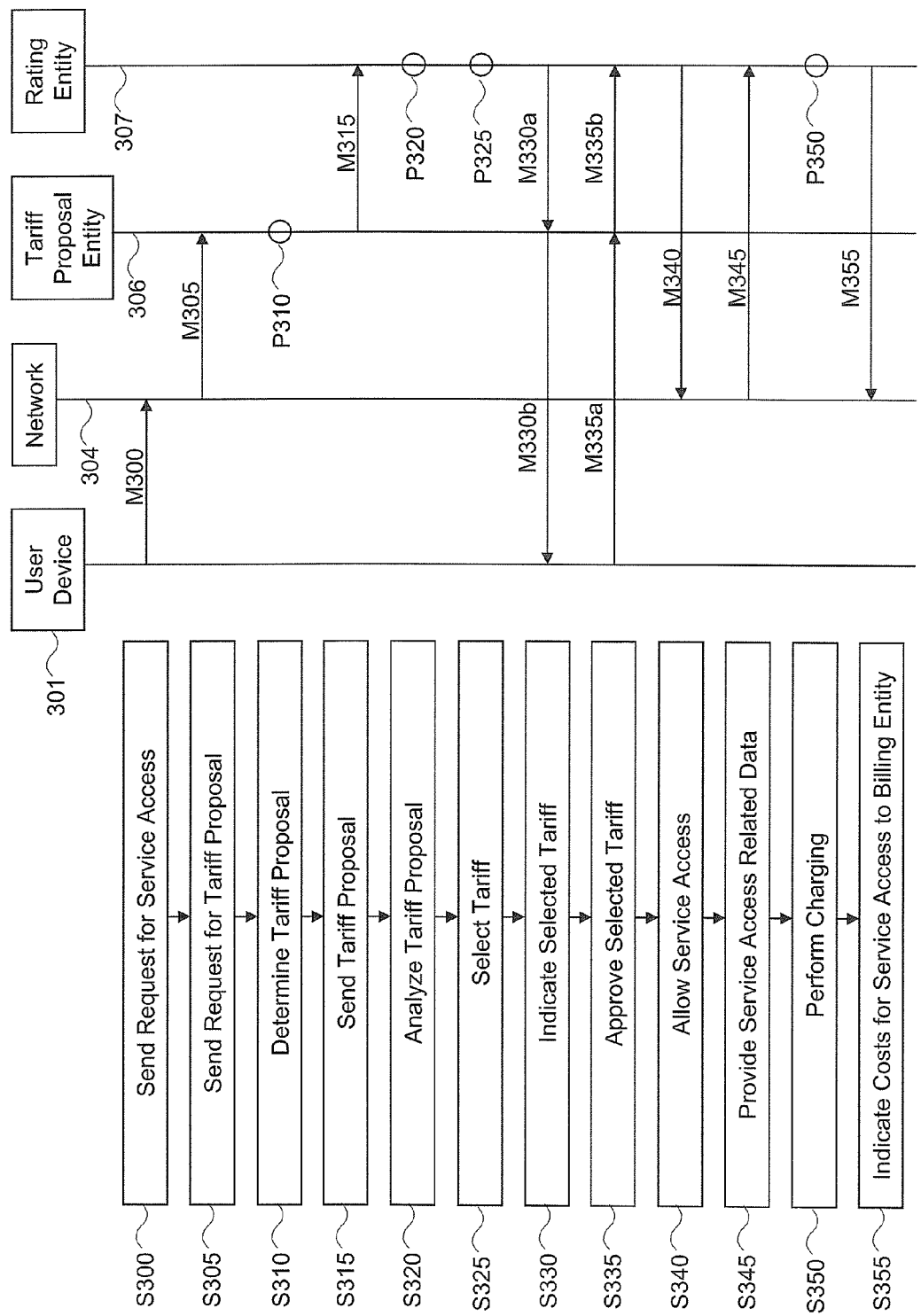

FIG. 3*a* shows a method flow-chart diagram and FIG. 3*b* corresponding messages exchanged between and processes performed at various entities 301, 304, 306, 307.

A user wishing to access a service may turn to his user device 301 and may activate a request for service access that may be sent S300 from the user device 301 to the network 304 (e.g. a core network) via message M300. The network 304 may send S305 via message M305 a request for a tariff proposal to a tariff proposal entity 306 associated with the user. An address of the tariff proposal entity 306 may be provided in conjunction with message M300. Alternatively or in addition, the message M300 may comprise or is accompanied by a user identity from that the network 304 may identify the tariff proposal entity 306 to which the user of the user device 301 is associated to. One or more of the messages M300, M305 may comprise or may be accompanied by information about the current charging-related state.

The tariff proposal entity 306 further determines S310, P310 a tariff proposal preferably under consideration of the current charging-related state and sends according to step S315 the tariff proposal via message M315 to the rating entity 307 that handles the charging for the service access. The rating entity 307 analyzes S320, P320 the tariff proposal in relation to tariff settings of the current charging-related state and selects S325, P325 one complying tariff accordingly. The current charging-related state may be known in advance by the rating entity 307 or may be indicated in conjunction with the provisioning S315 of the tariff proposal. For determining the tariff settings of the current charging-related state service access related data may be taken into account by the rating entity 307. This service access related data may be received in conjunction with provision S315 of the tariff proposal or obtained otherwise.

The selected tariff may be indicated S330 to the user device 301, e.g. via the tariff proposal entity 306 with messages M330*a*, M330*b*. Indication of the selected tariff to the user can be accomplished by appropriate indication means, e.g. a display or a loudspeaker. The user may approve S335 the selected service tariff to the rating engine. The user may indicate its approval of the indicated selected tariff by pressing a certain key on a keyboard of the user device 301 or uttering "Yes" or "OK" or the like into a microphone of the user device 301 and an indication of the approved selected tariff can be sent via messages M335*a*, M335*b* to the rating entity 307.

Triggered by the reception of the approval of the selected tariff, the rating entity 307 may indicate to the network 304 that service access is now allowed according to step S340 as an agreement on the applicable tariff, i.e. the selected tariff, has been reached between the user and the rating entity 307. An indication of the service access allowance may be sent via message M340 to the network 304.

The network 304 may provide service access related data, e.g. duration of the service access, number of transmitted packets, SMS delivery status etc., to the rating entity 307 as shown at step S345, e.g. via message M345 or a sequence of messages during the service access (not shown) and/or after service access completion.

Based on the selected tariff and the service access related data, the rating entity 307 performs S350, P350 the charging of the user for service access. In the charging process, the costs to be charged to the user for service access are calculated based on the selected tariff and the service access related data.

The charged costs for service access can be indicated S355 to a billing entity (not shown) accessible at or via the network 304, e.g. by message M355. A charging record may be created by the rating entity 307 to report the charged costs to the billing entity. The charging record comprises the charged costs (or an indication thereof such that the billing entity may determine the charged costs from the indicated information) and usually a user identity or a user-related group identity such that the billing entity can create a bill for the user or the corresponding group, respectively. The charging record may further comprise information about the service access (e.g. derived from service access related data) and preferably the selected tariff such that the billing entity is able to produce a bill that comprises all or a subset of the information about service access and selected tariff for a transparent billing of the user (or group).

Figure 4:
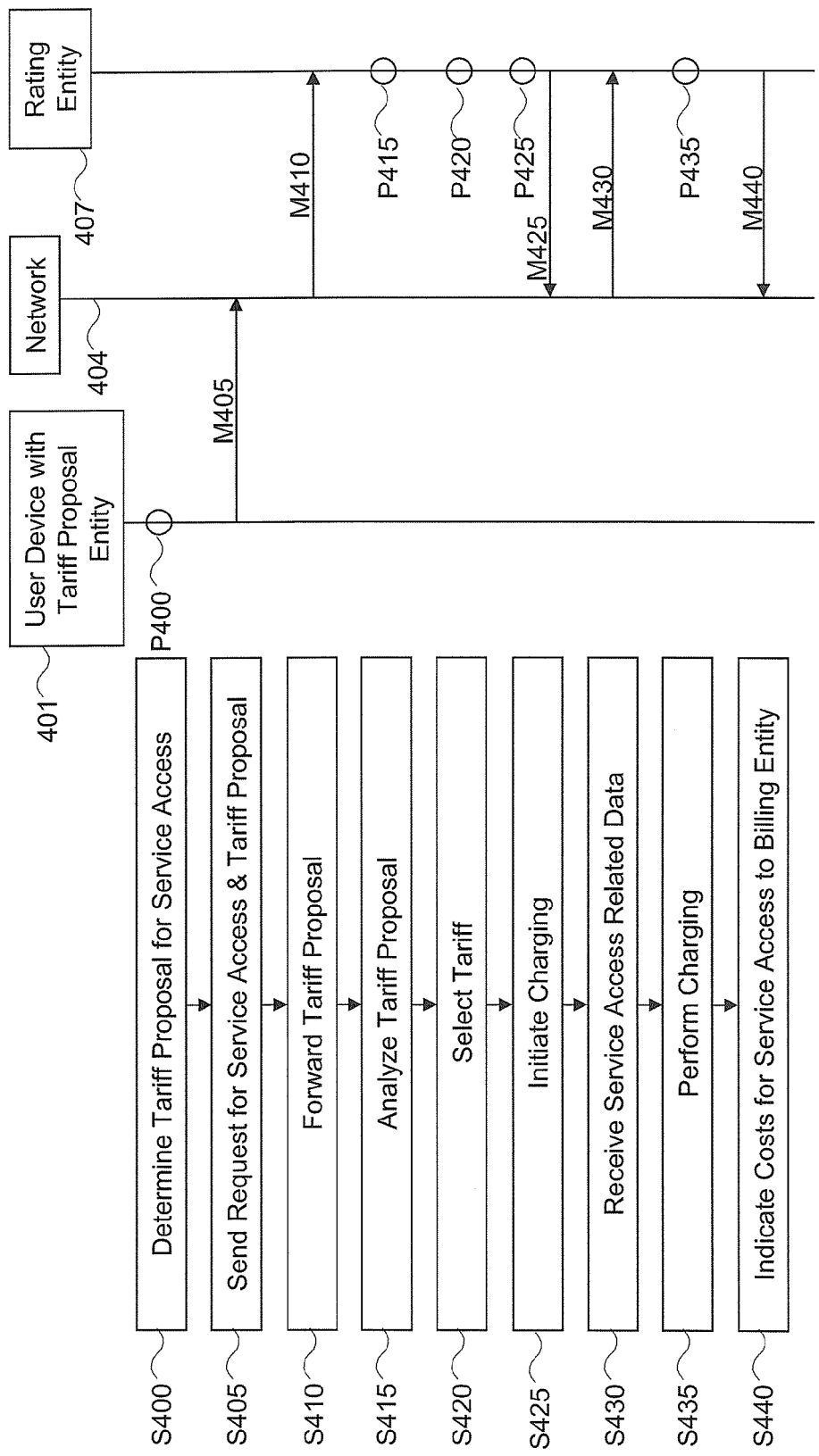

FIG. 4a shows a method flow-chart diagram and FIG. 4b corresponding messages exchanged between and processes performed at various entities 401, 404, 407.

Triggered by a selection of a service to be accessed, a tariff proposal entity in a user device 401 determines S400, P400 a tariff proposal for service access, preferably in accordance with a current charging-related state. A request for service access accompanied by the tariff proposal is sent S405 via message M405 to the network 404. The network 404 forwards S410 the tariff proposal via message M410 to a rating entity 407. Preferably, the tariff proposal is accompanied with service access related information for a more accurate determination of the tariff settings. The rating entity 407 analyzes S415,P415 the forwarded tariff proposal if it complies with one or more tariff settings of a current charging-related state. The current charging-related state may be known in advance by the rating entity 407 or may be indicated in conjunction with the forwarding S410 of the tariff proposal.

The rating entity 407 selects S420, P420 the proposed tariff if it complies with at least one of the tariff settings. An approval of the selected tariff at the user device 401 may be carried out, e.g. needed to fulfill legal requirements, but has been left out for this example of a terminal-centric arrangement in order to minimize communication network load caused by exchanging approval request and approval messages.

The rating entity 407 initiates S425, P425 charging and activates service access at the network 404 via message M425 (service access by the user device is not shown in FIG. 4) According to step S430, the network 404 may report back service access related data generated at the time of service access necessary to complete the charging process being initiated at step S425, P425 such that the overall costs for the service access can be calculated for performing charging S435, P435. The service access related data may be received via one or more messages M430. The calculated costs may be indicated S440 to a billing entity (not shown) via message M440.

Figure 5:
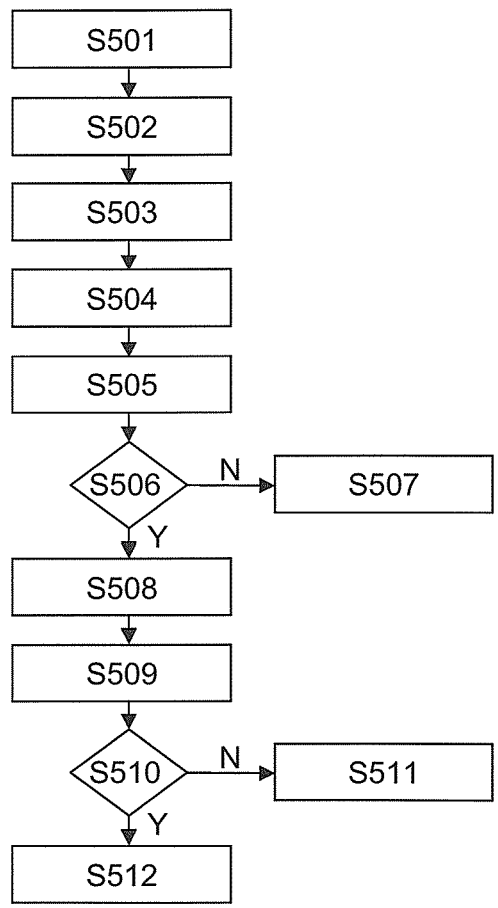
FIG. 5 shows a method flow-chart diagram according to an embodiment of the present invention.
Figure 6:
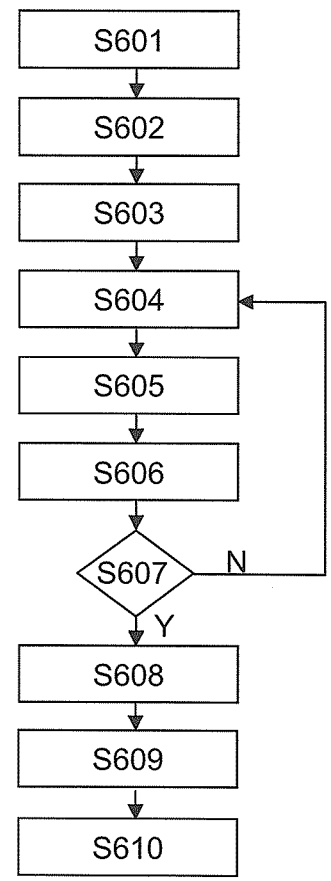
FIG. 6 shows a method flow-chart diagram according to an embodiment of the present invention.

The following description of FIGS. 5 and 6 uses the terms "operator", "user", "agent", and "application". In order to ease the understanding of the following embodiments, it is abstained from a further fragmentation of the communication network into sub-parts like an access network 103 or a core network 104 or a charging system 105 with rating entity 107. The following description also does not explicitly mention any links for the same reason. The communication network is assumed to be operated by an "operator" to provide one or more services 102 for access to one or more users and to perform charging therefore. Reception and analysis of tariff proposals, selection of a tariff and initiation of charging are assumed to be performed by a rating entity of the "operator". It is differentiated between charging-related states "Auction" and "Discount" and between "terminal-centric" and "network-centric" arrangements. The "user" is assumed to operate a user device and to be associated to a tariff proposal entity comprising an "agent" or an "application". In the following description an "agent" is used for a network-centric arrangement, because an agent may be installed on a computing entity in the network and is capable of autonomous operation without or with minimized user interaction. On the other hand, for a terminal-centric arrangement, an application operating on the user device is used that might be configured to provide more user interaction in order to involve the user more into the process of tariff proposing and interaction.

FIG. 5 depicts a flow chart of method steps for a "network-centric" arrangement and charging-related state "Discount".

According to step S501, the operator informs the user on her user device about the current charging-related state "Discount" for a certain service. The charging-related state may be kept in the user device until it changes to "Auction" or "Default" and can optionally be indicated permanently e.g. in the display of the user device.

In step S502, the user tries to access the "discounted" service.

The operator contacts in step S503 the user's agent with a request to propose a "discount" tariff. This request can optionally include a default service tariff of the rating entity in order to have an upper limit for the proposal.

According to step S504, the agent calculates a tariff proposal according to the preferences configured by the user and sends the tariff proposal back to the operator. The agent can optionally log the respective activity.

The operator compares in step S505 the proposed tariff to its discount tariff policy describing the tariff settings for the current charging-related state. The discount tariff policy could for instance describe that proposed tariffs are accepted if they fall into a tariff range defined by a minimum tariff and the default tariff for the service. The probability of acceptance could also be related to how close the proposed tariff is to the default tariff.

According to decision point S506, the operator determines whether the tariff proposal of the user is acceptable (Y) or not acceptable (N) for the operator, i.e. the tariff proposal complies with at least one tariff setting of the current charging-related state (Y) or not (N).

If the operator determines at decision point S506 that the tariff proposal is not acceptable (N), the method proceeds to step S507. The agent and/or the user device will be preferably informed about the rejection and the user might be offered to access the service using the "Default" tariff or might be invited to submit a further tariff proposal for access to the service.

In case the operator determines at decision point S506 that the tariff proposal is acceptable (Y), the tariff proposal is selected for charging the user for service access according to step S508.

The user will be offered access to the service and the selected tariff is indicated to the user for approval according to step S509. The selected tariff can be indicated to the user at the user device in any appropriate way, e.g. in the form of an in-call announcement or by indication on the display of the user device.

At decision point S510 it is checked whether the user accepts (Y) the selected tariff or not (N). For this reason, communication between the operator and the user may be established.

In case the user does not accept (N) the offered access at decision point S510, the operator does not provide service access but might charge a fee instead according to step 511. Both operator and agent could store information about the unsuccessful attempt.

According to step S512, service access is granted and charging is performed based on the selected tariff if the user accepts (Y) at decision point S510 the offered access at the selected tariff.

A "terminal-centric" solution for charging-related state "Discount" may be implemented rather similar. For example, steps S501-S503 and S505-S512 could be described in the same manner for a "terminal-centric" solution. Step S504 may be modified to allow for more user interaction, e.g. an application in the user device (instead of an agent in the network as for the network-centric arrangement) processes the request and asks the user to enter a tariff proposal. This can e.g. be done by typing in the tariff via a keyboard, by selecting a tariff from a list or by pressing "stop" when an increasing (decreasing) tariff is shown on the user device. Alternatively, the application could calculate the proposal based on user defined preference settings. In any case, the—howsoever—determined tariff is then transmitted from the user device to the operator as tariff proposal. The user device can optionally log the activity.

FIG. 6 depicts a flow chart of method steps for a "network-centric" arrangement and charging-related state "Auction".

According to step S601, the operator may inform the user on her user device about the current charging-related state "Auction" for a certain service. In GSM, the charging-related state could for instance be efficiently transmitted using the BCCH (Broadcast Control Channel). The charging-related state is kept in the user device until it changes to "Discount" or "Default" and can optionally be indicated permanently (e.g. in the display).

The user tries to access the "auctioned" service according to step S602. Information about this intention is transmitted to the operator, for instance via RACH (Random Access Channel). Such a communication also is possible in congestion situations of the access network.

The operator assigns the user to one or more service auctions in step S603. There might be n>=1 services of the same type available, e.g. two voice channels.

According to step S604, the operator contacts the user's agent with a request for an auction bid. The term "bid" is common in auctions and is used in the conjunction of FIG. 6 for a tariff proposal for access to the auctioned service. This request may include the minimum of the highest bids for the n auctions. If no bids are available, the default tariff calculated by the rating entity may be taken alternatively.

According to step S605, the agent calculates a new bid according to the preference rules configured by the user and sends it back to the operator. The agent can optionally log the respective activity.

According to step S606, the operator selects the n highest bids from all given bids received from multiple users and checks further if they comply with the current charging-related state settings, e.g. it may be checked if any of the n bids fall below a predefined threshold. Those bids may be excluded from further processing.

According to decision point S607, it is questioned if the auction is over (Y) or not (N). If the auction is over (Y), e.g. the time limit or the maximum number of bidding rounds is reached, then the operator proceeds to step S608. Otherwise it may step back to step S604, e.g. to collect more bids from these users and/or from other users.

In case the user is among those users with the n highest complying bids, the user's complying bid is selected as tariff for access to the service according to step S608.

The user's selected bid (i.e. selected tariff) may then be offered to the user for acceptance according to optional step S609. The selected tariff for the service may be indicated to the user in an appropriate way, e.g. in the form of an in-call announcement. If the user does not accept the offered access, the operator might charge a fee to the user. If the user accepts the selected bid, the method may proceed further to step S610.

According to step S610, charging based on the selected bid for service access for this user will be initiated.

Alternatively, if the operator does not accept the proposal, the agent and/or the user will be preferably informed about the rejection and access to the service will be denied.

Both operator and agent could store information about the unsuccessful attempt.

A "terminal-centric" solution for charging-related state "Auction" may be implemented rather similar. For example, steps S601-S603 and S606-S610 could be described in the same manner for a "terminal-centric" solution. Step S604 may be modified such that the request for auction bid is sent via a BCCH to the application in the user device acting as tariff proposal entity. Step S605 may be changed to allow for more user interaction, e.g. an application in the user device (instead of an agent in the network as for the network-centric arrangement) processes the request and asks the user to enter a tariff proposal. This can e.g. be done by typing in the tariff via a keyboard, by selecting a tariff from a list or by pressing "stop" when an increasing (decreasing) tariff is shown on the user device. Alternatively, the application could calculate the tariff proposal based on user defined preference settings. In any case, the selected value is then transmitted to the operator as tariff proposal via efficient transmission means. The user device can optionally log the activity.

Figure 7:
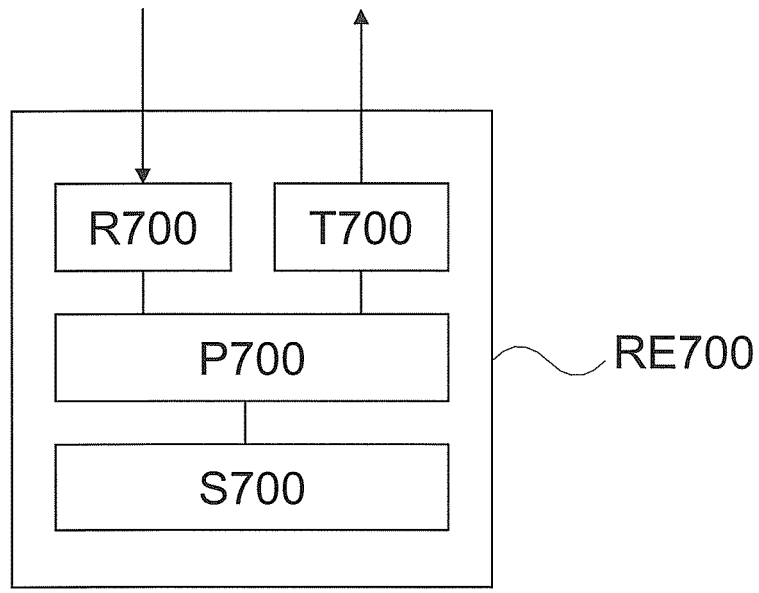
FIG. 7 shows a schematic illustration of an embodiment of a rating entity.
Figure 8:
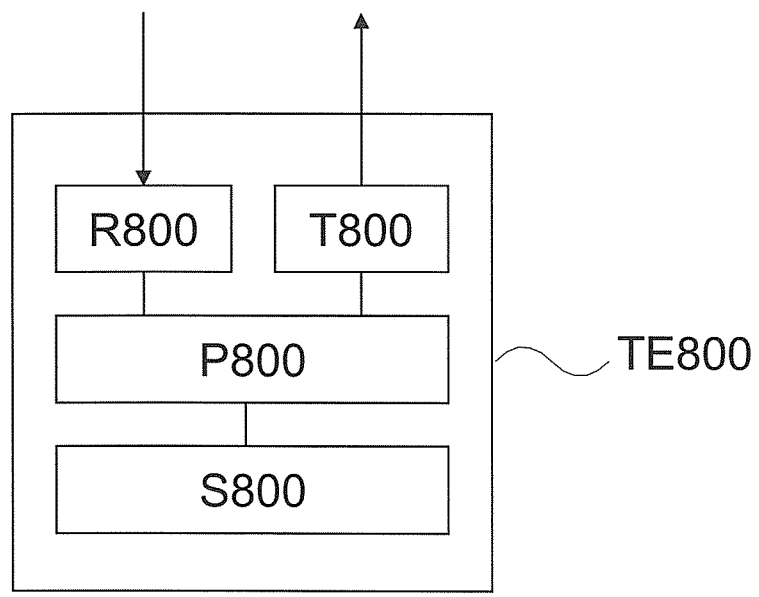
FIG. 8 shows a schematic illustration of an embodiment of a tariff proposal entity.

The invention is furthermore embodied in devices which are described in more detail below in relation to FIGS. 7 and 8. Reference signs are used for illustration only and are not intended to be limiting.

The invention may be embodied in a rating entity RE700 for charging a user for access to a service accessible via a communication network wherein at least two charging-related states are defined. The rating entity RE700 comprises a receiving unit R700 for receiving messages and a processing unit P700 for processing messages and information. Optionally, the rating entity RE700 comprises a transmission unit T700 for sending messages, e.g. for indication of tariffs or service access initiation, and/or a storage unit S700 for storing and/or retrieving of information, e.g. tariffs settings associated to charging-related states.

The receiving unit R700 may be adapted to receive from a tariff proposal entity associated with the user one or more tariff proposals for charging the user for accessing the service. The processing unit P700 may be adapted to perform an analysis of the one or more received tariff proposals in relation to a current charging-related state of the at least two charging-related states, wherein it may be determined if at least one of the one or more tariff proposals complies with at least one tariff setting associated with the current charging-related state. The processing unit P700 may be furthermore adapted to select a tariff of the at least one complying tariff proposals for charging the user for access to the service and to initiate a charging of the user for access to the service according to the selected tariff.

The processing unit P700 may be adapted to analyze in the analysis the one or more tariff proposals according to an order specified by the tariff proposal entity.

The processing unit P700 may be adapted to select an address for communication with the tariff proposal entity in dependence of the current charging-related state, e.g. when a switch from a first charging state to a second charging-related state occurs and the current charging state changes its associated tariff settings. Especially when the communication network load conditions of an access network, via that the user device is trying to access the service for the user, is indicated to be high (e.g. for current charging-related state "Auction"), the rating entity may be adapted to select an address of a network-centric tariff proposal entity associated to this user. If the communication network load conditions of the access network later on are lowered and sufficient capacity is available, an address of a terminal-centric tariff proposal entity of the user may be selected accordingly.

The processing unit P700 may be further adapted to initiate an indication of the selected tariff to a user device operated by the user for requesting approval of the selected tariff. The indication may be sent to the user device via the transmission unit T700. The processing unit P700 may be further adapted to initiate the charging according to the selected tariff when a response to the approval request from the user is in the affirmative. The response may be received via the receiving unit R700.

The processing unit P700 may be adapted to initiate access to the service after the selection of the tariff and/or after the reception of the affirmative response to the approval request.

The receiving unit R700 may be adapted to receive from at least one further entity associated with at least one further user one or more further tariff proposals for charging the at least one further user for accessing the service. The processing unit P700 may be adapted to analyze the received one or more tariff proposals of the user and the at least one further user in relation to the current charging-related state wherein it is determined if said received one or more tariff proposals comply with the at least one tariff setting and wherein one or more most valuable tariffs of the one or more complying tariff proposals are selected on a per user base up to a maximum number of users allowed for access to the service. Furthermore, the processing unit P700 may be adapted to initiate a charging for access to the service for at least one user of the user and the at least one further user for which a most valuable tariff has been selected. The charging may be in accordance with the selected most valuable tariff corresponding to said at least one user.

The receiving unit R700 may be further adapted to receive during service access one or more subsequent tariff proposals. The processing unit P700 may be adapted to analyze the one or more subsequent tariff proposals for compliance with at least one tariff setting associated to a current charging-related state of the at least two charging-related states, to select a subsequent tariff of the one or more subsequent tariff proposals, and to initiate an adaptation of the charging for access to the service according to the selected subsequent tariff.

The invention may be embodied in a tariff proposal entity TE800 for charging a user for access to a service accessible via a communication network wherein at least two charging-related states are defined. The tariff proposal entity TE800 comprises a processing unit P700 for processing messages and information and a transmission unit T800 for sending messages. Optionally, the tariff proposal entity TE800 comprises a receiving unit R800 for receiving messages, e.g. for indication of tariffs or current charging-related state, and/or a storage unit S800 for storing and/or retrieving of information, e.g. tariffs settings associated to a current charging-related state.

The processing unit P800 may be adapted to determine one or more tariff proposals in accordance with at least one preference of the user. The transmitting unit T800 may be adapted to send the determined one or more tariff proposals for charging the user for accessing the service to a rating entity.

The receiving unit R800 may be adapted to receive information about a current charging-related state of the at least two charging-related states. The processing unit P800 may be adapted to consider the current charging-related state when determining the one or more tariff proposals.

The determination of the one or more tariff proposals may triggered by a request for tariff proposal for charging the user for accessing the service. The request may be received via the receiving unit R800 and forwarded to the processing unit P800 triggering the determination of the one or more tariff proposals.

The communication network may comprise a wireless access network with a wireless link and the user device is operated at a first side of the wireless link and the tariff proposal entity TE800 and the rating entity RE700 may be operated at a second side of the wireless link.

Alternatively or in addition, the tariff proposal entity TE800 may be operated at the user device. The tariff proposal entity TE800 may share none, at least one, or all of its units R800, T800, P800, S800 with the user device.

The tariff proposal entity may comprise a software agent which may be loaded into the processing unit P800. An agent is preferably used for a network-centric arrangements, however, could be used alternatively or in addition for a terminal-centric arrangement.

The present invention also concerns a computer program comprising portions of software codes in order to implement the method as described above when operated at a rating entity. The computer program can be stored on a computer readable medium. The computer-readable medium can be a permanent or rewritable memory within the rating entity or located externally. The computer program can be also transferred to the rating entity for example via a cable or a wireless link as a sequence of signals.

The computer program may comprise code adapted to analyze one or more tariff proposals for charging the user for accessing the service. The one or more tariff proposals, received from a tariff proposal entity associated with the user, may be analyzed in relation to a current charging-related state of the at least two charging-related states defined in the communication network. In the analysis it is determined if at least one of the one or more tariff proposals complies with at least one tariff setting associated with the current charging-related state. The code may be further adapted to select a tariff of the at least one complying tariff proposals for charging the user for access to the service and to initiate a charging of the user for access to the service according to the selected tariff. The computer program may comprise further code to implement steps of a method executed by a rating entity.

The present invention also concerns a computer program comprising portions of software codes in order to implement the method as described above when operated at a tariff proposal entity. The computer program can be stored on a computer readable medium. The computer-readable medium can be a permanent or rewritable memory within the tariff proposal entity or located externally. The computer program can be also transferred to the tariff proposal entity for example via a cable or a wireless link as a sequence of signals.

The computer program may comprise code adapted to determine one or more tariff proposals in accordance with preferences of the user and to initiate a sending of the determined one or more tariff proposals for charging the user for accessing the service to a rating entity. The computer program may comprise further code to implement steps of a method executed by a tariff proposal entity.

The invention claimed is:

1. A method in a rating entity of charging a user for access to a service accessible via a communication network, wherein at least two charging-related states are defined, the method comprising the steps of:
   selecting by the rating entity a tariff proposal entity from a plurality of tariff proposal entities associated with the user by selecting an address for communication with the tariff proposal entity in dependence of a current charging-related state of the at least two charging-related states;

receiving at the rating entity from the tariff proposal entity, one or more tariff proposals for charging the user for accessing the service;

analyzing by the rating entity the one or more tariff proposals in relation to the current charging-related state of the at least two charging-related states, wherein it is determined if at least one of the one or more tariff proposals complies with at least one tariff setting associated with the current charging-related state;

selecting by the rating entity a tariff of the at least one complying tariff proposals for charging the user for access to the service; and, initiating by the rating entity a charging of the user for access to the service according to the selected tariff.

2. The method according to claim 1, wherein the analyzing step comprises analyzing the one or more tariff proposals according to an order specified by the tariff proposal entity.

3. The method according to claim 1, wherein the at least two charging-related states are associated with at least two communication network load conditions.

4. The method according to claim 1, further comprising the steps of:

sending an indication of the selected tariff to a user device operated by the user or requesting approval of the selected tariff; and, initiating the charging according to the selected tariff when a response to the approval request from the user is in the affirmative.

5. The method according to claim 1, further comprising the step of initiating access to the service after the selection of the tariff and/or after the reception of the affirmative response to the approval request.

6. The method according to claim 1, further comprising the steps of receiving from at least one further entity associated with at least one further user one or more further tariff proposals for charging the at least one further user for accessing the service;

analyzing the one or more tariff proposals of the user and the at least one further user in relation to the current charging-related state, wherein it is determined if the one or more tariff proposals comply with the at least one tariff setting and wherein one or more most valuable tariffs of the one or more complying tariff proposals are selected on a per user base up to a maximum number of users allowed for access to the service; and initiating a charging for access to the service for at least one user, of the user and the at least one further user, for which a most valuable tariff has been selected, the charging being in accordance with the selected most valuable tariff corresponding to said at least one user.

7. The method according to claim 1, comprising the further steps of:

receiving during service access one or more subsequent tariff proposals;

analyzing the one or more subsequent tariff proposals for compliance with at least one tariff setting associated to a current charging-related state of the at least two charging-related states;

selecting a subsequent tariff of the one or more subsequent tariff proposals; and, initiating an adaptation of the charging for access to the service according to the selected subsequent tariff.

8. The method according to claim 1, wherein the tariff proposal entity is operated at the user device.

9. The method according to claim 1, wherein the tariff proposal entity comprises a software agent.

10. The method of claim 1, wherein the at least two charging-related states are defined as low network load conditions and high network load conditions, wherein further charging-related states include Default, Discount and Auction charging-related states, said Discount charging-related state being applicable to high service availability and priced lower than the Auction and Default charging-related states.

11. A rating entity for charging a user for access to a service accessible via a communication network, wherein at least two charging-related states are defined, the rating entity comprising:

a selecting unit for selecting a tariff proposal entity from a plurality of tariff proposal entities associated with the user by selecting an address for communication with the tariff proposal entity in dependence of a current charging-related state of the at least two charging-related states;

a receiving unit for receiving messages and a processing unit for processing messages and information, the receiving unit is adapted to receive from the tariff proposal entity one or more tariff proposals for charging the user for accessing the service, the processing unit is adapted to analyze the one or more tariff proposals in relation to the current charging-related state of the at least two charging-related states, wherein it is determined if at least one of the one or more tariff proposals complies with at least one tariff setting associated with the current charging-related state, to select a tariff of the at least one complying tariff proposals for charging the user for access to the service, and to initiate a charging of the user for access to the service according to the selected tariff.

12. The rating entity of claim 11, wherein the at least two charging-related states are defined as low network load conditions and high network load conditions, wherein further charging-related states include Default, Discount and Auction charging-related states, said Discount charging-related state being applicable to high service availability and priced lower than the Auction and Default charging-related states.

* * * * *

UNITED STATES PATENT AND TRADEMARK OFFICE
CERTIFICATE OF CORRECTION

PATENT NO. : 8,626,620 B2  
APPLICATION NO. : 12/523294  
DATED : January 7, 2014  
INVENTOR(S) : Schuba et al.

Page 1 of 1

It is certified that error appears in the above-identified patent and that said Letters Patent is hereby corrected as shown below:

In the Specification

In Column 1, Line 40, delete "messages. number" and insert -- messages, number --, therefor.

In Column 12, Line 53, delete "511." and insert -- S511. --, therefor.

In the Claims

In Column 17, Line 23, in Claim 4, delete "or" and insert -- for --, therefor.

In Column 17, Line 50, in Claim 7, delete "comprising the further" and insert -- further comprising the --, therefor.

Signed and Sealed this
Fourteenth Day of April, 2015

Michelle K. Lee
*Director of the United States Patent and Trademark Office*